United States Patent
Jhang et al.

(10) Patent No.: US 11,977,655 B2
(45) Date of Patent: May 7, 2024

(54) SECURITY EVENT ASSOCIATION TECHNOLOGY

(71) Applicant: International Business Machines Corporation, Armonk, NY (US)

(72) Inventors: Jia-Sian Jhang, Taipei (TW); Chen-Yu Kuo, Taipei (TW); Hsiao-Yung Chen, Taipei (TW); Lu Cheng Lin, New Taipei (TW); Chien Wen Jung, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 17/001,797

(22) Filed: Aug. 25, 2020

(65) Prior Publication Data

US 2022/0067190 A1    Mar. 3, 2022

(51) Int. Cl.
*G06F 16/245* (2019.01)
*G06F 21/62* (2013.01)

(52) U.S. Cl.
CPC ........ *G06F 21/6227* (2013.01); *G06F 16/245* (2019.01)

(58) Field of Classification Search
CPC .... G06F 21/6227; G06F 16/245; G06F 16/25; H04L 63/1416; H04L 9/0643
See application file for complete search history.

(56) References Cited

U.S. PATENT DOCUMENTS

| | | | |
|---|---|---|---|
| 8,132,258 B1 * | 3/2012 | Jensen | H04L 63/1416 713/188 |
| 8,498,995 B1 * | 7/2013 | Gond | G06F 16/245 707/754 |
| 8,667,588 B2 | 3/2014 | Stolfo | |
| 9,275,237 B2 | 3/2016 | De Cristofaro | |
| 9,781,151 B1 * | 10/2017 | McCorkendale | G06F 21/562 |
| 2008/0162592 A1 * | 7/2008 | Huang | H04L 41/0686 |
| 2017/0235775 A1 * | 8/2017 | McKenna | G06F 16/285 707/741 |
| 2017/0322959 A1 * | 11/2017 | Tidwell | G06F 11/30 |
| 2018/0359232 A1 | 12/2018 | Sander | |

OTHER PUBLICATIONS

M. Bhushan, M. Singh and S. K. Yadav, "Big data query optimization by using Locality Sensitive Bloom Filter," 2015 2nd International Conference on Computing for Sustainable Global Development (INDIACom), 2015, pp. 1424-1428. (Year: 2015).*

(Continued)

*Primary Examiner* — Robert B Leung
(74) *Attorney, Agent, or Firm* — Kimberly S. Zillig

(57) ABSTRACT

A computer-implemented method, a computer system, and computer program product for associating security events. The method includes obtaining a result of implementation of one or more Locality-Sensitive Hashing (LSH) functions to feature data of a first event detected by a first device. The method also includes mapping the result to one or more positions in a data structure. In response to data elements of the one or more positions indicating first information associating with the one or more positions exists in a storage, the method includes obtaining the first information from the storage. The method further includes sending the first information to the first device.

20 Claims, 6 Drawing Sheets

(56) References Cited

OTHER PUBLICATIONS

T. Li and H. Shen, "Searching Massive Databases Using Locality Sensitive Hashing." (2014). (Year: 2014).*

J. Qian, Q. Zhu and H. Chen, "Multi-Granularity Locality-Sensitive Bloom Filter," in IEEE Transactions on Computers, vol. 64, No. 12, pp. 3500-3514, Dec. 1, 2015, doi: 10.1109/TC.2015.2401011. (Year: 2015).*

S. S. Chauhan and S. Batra, "Finding similar items using LSH and Bloom Filter," 2014 IEEE International Conference on Advanced Communications, Control and Computing Technologies, Ramanathapuram, India, 2014, pp. 1662-1666, doi: 10.1109/ICACCCT.2014.7019390. (Year: 2014).*

A. Atifi and E. Bou-Harb, "On correlating network traffic for cyber threat intelligence: A Bloom filter approach," 2017 13th International Wireless Communications and Mobile Computing Conference (IWCMC), Valencia, 2017, pp. 384-389, doi: 10.1109/IWCMC.2017.7986317.

J. Oliver, C. Cheng and Y. Chen, "TLSH—A Locality Sensitive Hash," 2013 Fourth Cybercrime and Trustworthy Computing Workshop, Sydney NSW, 2013, pp. 7-13, doi: 10.1109/CTC.2013.9.

R. van Rijswijk-Deij, G. Rijnders, M. Bomhoff and L. Allodi, "Privacy-Conscious Threat Intelligence Using DNSBLoom," 2019 IFIP/IEEE Symposium on Integrated Network and Service Management (IM), Arlington, VA, USA, 2019, pp. 98-106.

Who's sharing threat intelligence?, https://www.anomali.com/resources/sharing-threat-intelligence, Printed: Mar. 10, 2020.

Y. Hua, B. Xiao, B. Veeravalli and D. Feng, "Locality-Sensitive Bloom Filter for Approximate Membership Query," in IEEE Transactions on Computers, vol. 61, No. 6, pp. 817-830, Jun. 2012, doi: 10.1109/TC.2011.108.

* cited by examiner

SECURITY EVENT ASSOCIATION TECHNOLOGY

BACKGROUND

The present disclosure relates to security event association, and more specifically to applying locality-sensitive hashing functions when associating security events Currently, information query technologies can be used in many network circumstances. Different entities can use information query technologies to search information, such as notification information, instruction information, stored in databases. It has become a challenge to query information efficiently and securely.

SUMMARY

According to embodiments of the present disclosure, there is provided a computer-implemented method for security event association. According to the computer-implemented method, a computer system can obtain a result of implementation of one or more Locality-Sensitive Hashing (LSH) functions to feature data of a first event detected by a first device. The computer system can map the result to one or more positions in a data structure. In response to data elements of the one or more positions indicating first information associating with the one or more positions exists in a storage, the computer system can obtain the first information from the storage. Then, the computer system can send the first information to the first device.

According to another embodiment of the present disclosure, there is provided a computer system for information query. The computer system comprises one or more processors, a computer-readable memory coupled to the one or more processors. The computer-readable memory comprises instructions that when executed by the one or more processors perform actions of the above method.

According to another embodiment of the present disclosure, there is provided a computer program product for information query. The computer program product comprises a computer readable storage medium having program instructions embodied therewith, the program instructions executable by a processor to cause the processor to perform actions of the above method.

BRIEF DESCRIPTION OF THE DRAWINGS

These and other features, aspects, and advantages of the embodiments of the disclosure will become better understood with regard to the following description, appended claims, and accompanying drawings where:

Figure 1:
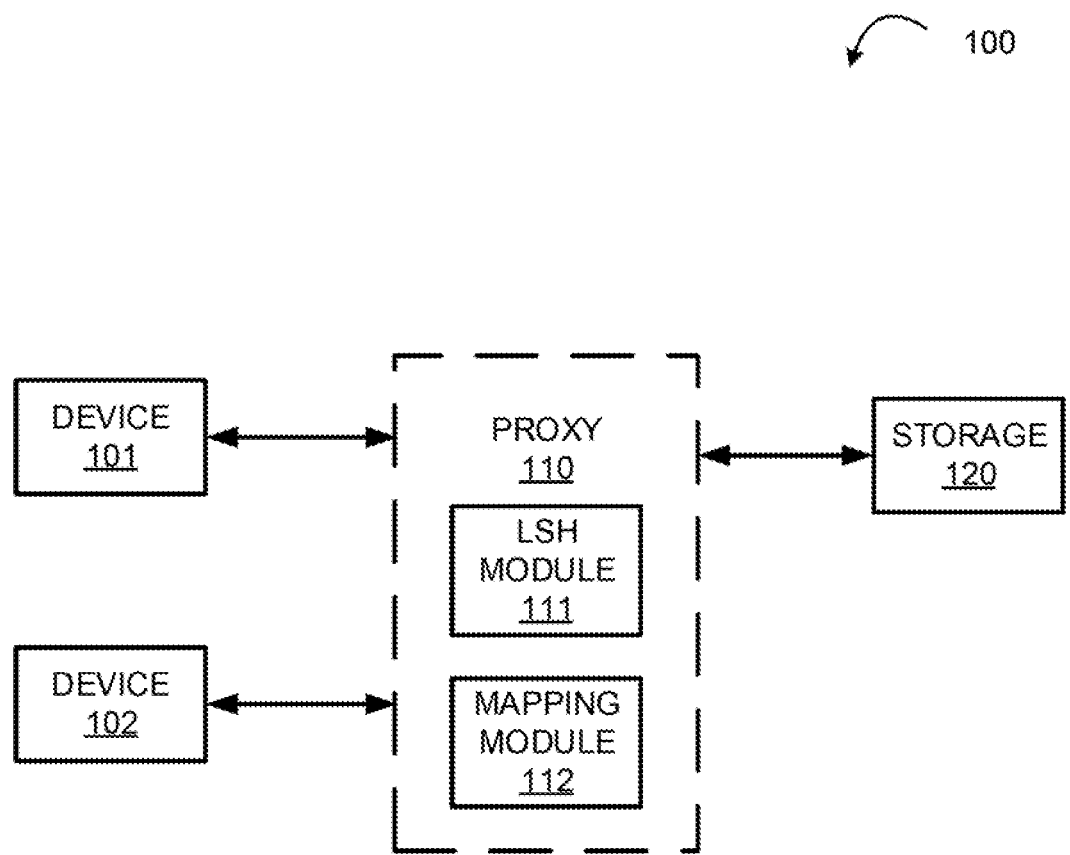
FIG. 1 depicts a schematic diagram of an example network environment, in accordance with embodiments of the present disclosure.

While the present disclosure is amenable to various modifications and alternative forms, specifics thereof have been shown by way of example, in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to security event association, and more specifically to applying locality-sensitive hashing functions when associating security events. While the present disclosure is not necessarily limited to such applications, various aspects of the disclosure may be appreciated through a discussion of various examples using this context.

The present disclosure provides methods, systems, and computer program products for information query. Referring now to FIG. 1, an example network environment 100 is depicted according to embodiments of the present disclosure. As an example, a device 101/102 can access a proxy 110. The device 101/102 can be any type of device that can be used for sending/receiving data. The proxy 110 can be any type of device that can be used to process and forward data. The proxy 110 can access a storage 120. The storage 120 can be any type of storage device that can be used for storing data. In some embodiments, the storage 120 can be an information sharing server used for network/system security management.

In some embodiments, the proxy 110 can be a separate device outside of the device 101 and the storage 120. The connections between the device 101 and the proxy 110, between the proxy 110 and the storage 120, can be direct or indirect. The connections include any type of network connection. The network connection can be a wired or wireless data link which can be used for communication between the devices, such as a Local Area Network (LAN) link, a Wide Area Network (WAN) link, an Internet link, a cellular network link, etc. In some other embodiments, the proxy 110 and the storage 120 can constitute a single device. It shall be understood that the devices and modules in the network environment 100 are just for describing principles of the present disclosure. Other devices and modules can also be comprised in the network environment 100, and one or more of the devices and modules can be combined with another of the devices and modules to function as a single device and module or divided into a plurality of sub devices and modules.

The device 101 can detect a first event, such as a network/system security event relating to the device 101 and obtain feature data of the first event. As an example, the first event can be a network/system security incident detected by the device 101, such as a malware incident, network attack incident, system failure, etc. The network/system security incident can occur on the device 101 or a separate device detectable by the device 101. As a further example, the first event can also be other types of network/system incidents. It shall be understood that the device 101 can use any now known or to be developed technologies to obtain any type of feature data of the first event. As an example, the feature data of the first event may comprise identification and other description information of the first event.

In some embodiments, the feature data may include artifacts of the event, such as, one or more of email address, HTTP headers, time/location of the event, systems or users involved in the event, Internet Protocol (IP) addresses, mac addresses, ports, user accounts, usernames, hostnames, domain names, process identification (ID), process trees, log files, certificates, observed files, etc.

In Table 1, an example of the feature data of an event is depicted, wherein the IP address related to the first event is "9.9.9.9", and the md5 value of the event is "0320ff752258". It shall be understood that the feature data may further comprise other data.

TABLE 1

| IP Address | 9.9.9.9 |
|---|---|
| md5 | 0320ff752258 |
| ... | ... |

As a further example, the feature data may include the following items: username: user A; IP address: 9.9.9.9; hostname: aaa.com; port: 443; process ID: 1234.

According to embodiments of the present invention, the proxy 110 can obtain a result of implementation of one or more Locality-Sensitive Hashing (LSH) functions to feature data of the first event detected by the device 101. Hereinafter, the result of implementation of the LSH functions can also be referred to as LSH result.

In some embodiments, the device 101 can send the feature data of the first event to the proxy 110. The proxy 110 can comprise an LSH module 111. After receiving the feature data of the event, the LSH module 111 of the proxy 110 can implement one or more LSH functions to the received feature data. The LSH is an algorithm that uses a hashing function to simplify data without losing features and classifies data with this hash value. Similar items can have similar hash values and end up going in the same data class. LSH can reduce time consumption and be more efficient for complex cases to find out related data. In some examples, the LSH can hash similar input items and output same, similar or adjacent results. It shall be understood that the LSH module 111 can apply any suitable LSH functions now known or to be developed to obtain an LSH result of the received feature data.

In some other embodiments, the device 101 can comprise an LSH module which implements one or more LSH functions to the feature data to get an LSH result of the feature data. Then, the device 101 can send the LSH result to the proxy 110.

According to embodiments of the present disclosure, the proxy 110 can map the result to one or more positions in a data structure. As an example, the proxy 110 can further comprise a mapping module 112, which maps the LSH result to one or more positions in the data structure. In some embodiments, the mapping module 112 can be implemented as a Bloom Filter deployed in the proxy 110. Data elements of the one or more positions of the data structure may comprise a digit or a counter of the data structure of the Bloom Filter. The data structure can be an array, a list, a table, a vector, etc. The one or more positions in the data structure can be indexes, or sequence numbers, etc. of data elements in the data structure.

It shall be understood that many now known or to be developed manners can be used to map the result to the one or more positions in the data structure. For example, the LSH result can be a string constituted by digits ("0" or "1") of preset length. The string of preset length can be mapped directly to an array of the preset length. If one or more digits in the string of the LSH result are "1", the LSH result can be mapped to positions in the array corresponding to the digits "1".

In some other examples, padding digits can be inserted into the string of preset length to obtain a padded string, or some digits can be selected from the string of preset length to obtain a sampled string. The padded string or the sampled string can then be mapped to an array of corresponding length (an increased or decreased length of the preset length). If one or more digits in the padded string or the sampled are "1", the LSH result can be mapped to positions in the array corresponding to the digits "1".

According to embodiments of the present disclosure, in response to data elements of the one or more positions indicating first information associating with the one or more positions exists in the storage 120, the proxy 110 can obtain the first information from the storage 120. Then, the proxy 110 can send the first information to the device 101. In this example, the first information is previously received from another device (such as, the device 102) and stored in the storage 120.

In some embodiments, the first information includes information relating to a second event. The second event can be an event detected by another device (such as, the device 102). The LSH result of the feature data of the first event is the same as an LSH result of implementing the LSH functions to the feature data of the second event. The information relating to the second event can include measures or instructions (such as, investigation notes, resolution, applied actions and remediation, etc.) relating to the second event.

As an example, if the device 102 detects the second event, the device 102 can collect feature data of the second event. The device 102 can implement the one or more LSH functions to the obtained feature data to obtain a second LSH result. As an alternative manner, the device 102 can send the collected feature data of the second event to the proxy 110, then the proxy 110 can implement the one or more LSH functions to the feature data to obtain the second LSH result. Due to characteristics of the LSH functions, if the feature data of the second event is similar to the feature data of the first event (i.e. at least parts of feature data of the second event may be same to at least parts of the feature data of the first event), the second LSH result may be same to the LSH result of the feature data of the first event. The second event can also be mapped to the one or more positions in the data structure. The device 102 can send information including its suggested measures or instructions relating to the second event (which is also referred to as the first information herein) to the proxy 110. The proxy 110 can associate the received first information with the one or more positions and store the received first information in the storage 120. The proxy 110 can update the one or more positions to indicate the first information associating with the one or more positions exists in the storage. The first information stored in the storage 120 can be shared to other devices detecting similar network/system security events (such as, the device 101 detecting the first event).

In some embodiments, in response to data elements of the one or more positions indicating no associated information exists in the storage 120, the proxy 110 can send a negative response message to the device 101. The device 101 will then receive the negative response message and note that there is no associated information exists in the storage 120.

According to embodiments of the present disclosure, the device 101 can send a second information to the proxy 110. The second information can comprise mitigation measures or instructions relating to the first event provided by the device 101. The proxy 110 can associate the second information with the one or more positions and store the second information in the storage 120. The proxy 110 can update the one or more positions to indicate the second information associating with the one or more positions exists in the storage.

Figure 2:
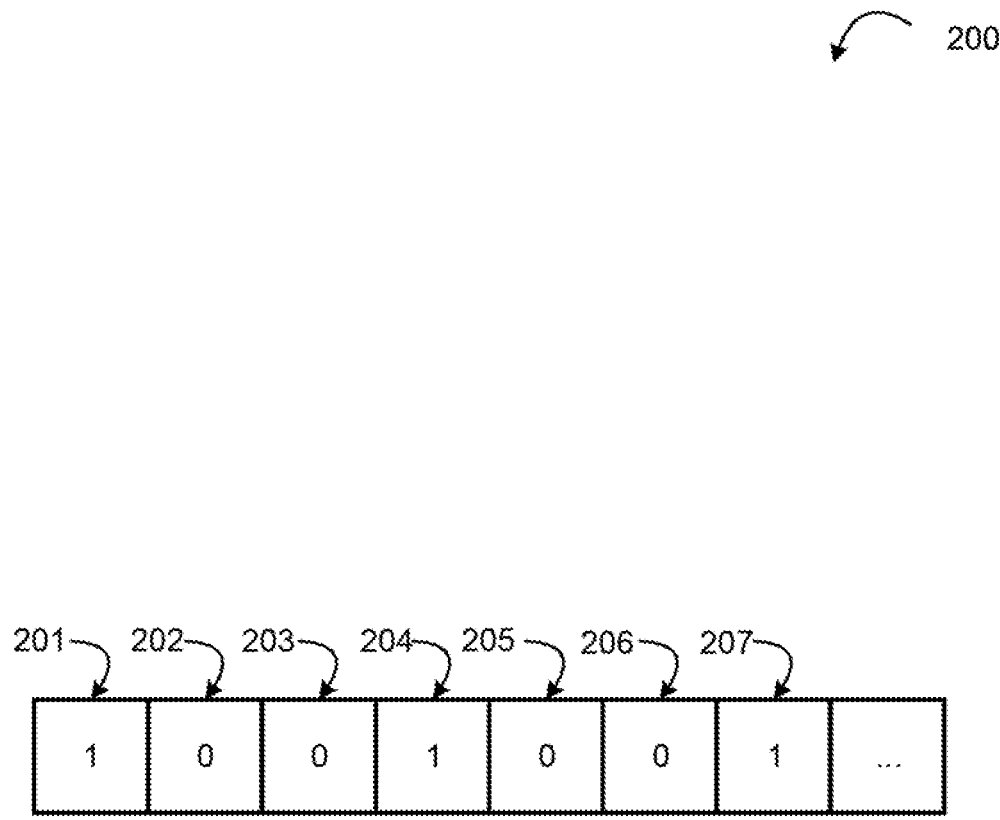
FIG. 2 depicts a schematic diagram of a data structure, in accordance with embodiments of the present disclosure.

Referring now to FIG. 2, an example data structure 200 is depicted according to an embodiment of the present invention. After implementing one or more LSH functions to the feature data, the LSH result can be a string constituted by digits ("0" or "1") of preset length, such as "1001001". Then, the LSH result can be mapped to positions 201, 204, and 207 in a data structure (such as, an array) in a Bloom Filter deployed by the proxy 110. In this example, positions 201, 204, and 207 respectively corresponds to the first, the fourth, and the seventh data element in the data structure. If the digits or counters (data elements) of the positions 201, 204, and 207 of the data structure are all "1", the digits or counters (data elements) of the positions 201, 204, and 207 indicate there is related information (such as, instructions related to an event previously stored associating with the positions 201, 204, and 207) available in the storage 120, the related information can be fetched by the proxy 110 from the storage 120. Then, the fetched information can be sent by the proxy 110 to the device 101. If the digits or counters of the positions 201, 204, and 207 indicate there is no related information available, for example the digits of the positions 201, 204, and 207 are all "0", or some of the digits of the positions 201, 204, and 207 are "0", the proxy 110 will send a negative response message to the device 101. Then the device 101 can note that there is no information related to the first event available in the storage 120.

In some further examples, if the device 101 wants to provide instructions relating to the first event, the device 101 can send a message to the proxy 110, and the proxy 110 can associate the information with the positions 201, 204, and 207, and store information comprised in the message into the storage 120. The proxy 110 can update the digits corresponding to the positions 201, 204, and 207 from "0" to "1", or increase the counters corresponding to the positions 201, 204, and 207 by 1 to indicate corresponding message available in the storage 120.

The proxy 110 can further store the association of positions in the data structure and shared information in the storage 120. As an example, Table 2 shows association of positions in the data structure and shared information. In this example, the shared information associating with positions "201, 204, and 207" is "Malware ABC". That means, if an LSH result of the first event is mapped to the positions "201, 204, and 207" in the data structure, and data elements of the positions "201, 204, and 207" indicates information related existed in the storage 120, the information "Malware ABC" associating with the positions "201, 204, and 207" can be obtained by the proxy 110 and then sent by the proxy 110 to the device 101. Then the device 101 note that the first event may be caused by Malware ABC.

TABLE 2

| Positions | Information |
| --- | --- |
| 201, 204, 207 | Malware ABC |
| 201, 205, 206 | Malware DEF |
| . . . | . . . |

Embodiments of the present disclosure provide advantages in querying instructions of events. Even feature data of events include information which is not able to be shared due to access control policies, embodiments of the present disclosure can still be able to query related instructions of previous events which are the same with or similar to the first event.

Figure 3:
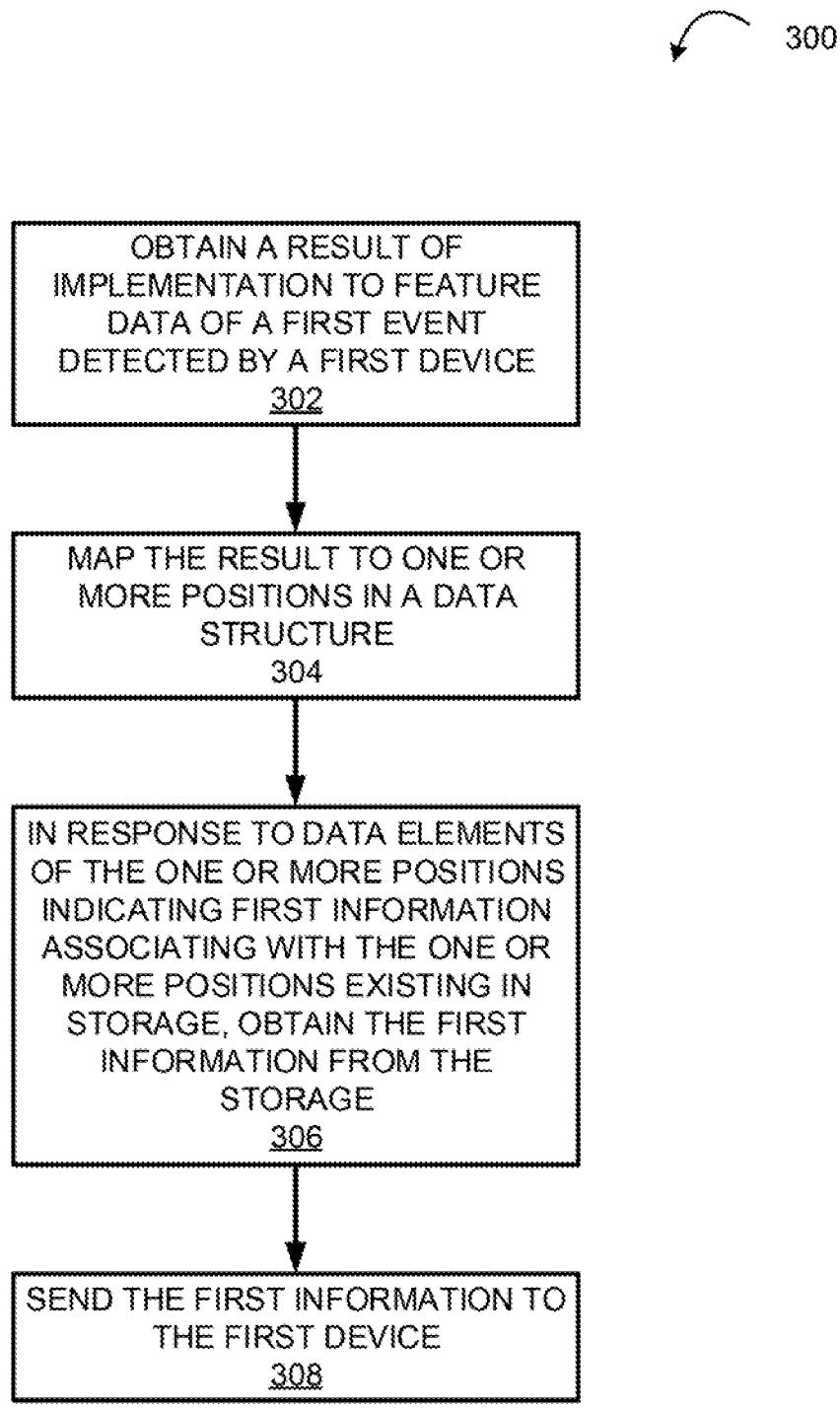
FIG. 3 depicts a flow chart of an example method for information query, in accordance with embodiments of the present disclosure.

With reference to FIG. 3, a method 300 for information query is illustrated according to an embodiment of the present invention. It should be noted that the method 300 is only illustrative and is not intended to suggest any limitation as to the scope of use or functionality of embodiments of the present invention.

At step 302, a result of implementation of one or more Locality-Sensitive Hashing (LSH) functions to feature data of a first event detected by a first device can be obtained. At step 304, the result can be mapped to one or more positions in a data structure. At step 306, in response to data elements of the one or more positions indicating first information associating with the one or more positions exists in a storage, the first information can be obtained from the storage. The first information can be previously received from another device and stored in the storage. Then, at step 308, the first information can be sent to the first device.

In some embodiments, in response to the data elements of the one or more positions indicating no associated information exists, a negative response message can be sent by the computer system to the first device.

In some embodiments, the computer system 400 further receives a second information from the first device. Then, the computer system 400 associates the second information with the one or more positions and store the second information. Then, the computer system 400 updates the data elements of the one or more positions to indicate the second information associating with the one or more positions exists in the storage.

In some embodiments, the first information includes information relating to a second event, and the result is same to a result of implementation of the LSH functions to the feature data of the second event.

In some embodiments, the information relating to the first event and/or the second event includes measures or instructions relating to the first event and/or the second event.

In some embodiments, the feature data of the first event includes access restricted data.

In some embodiments, the data structure is applied in a Bloom Filter, and each of the one or more positions of the data structure corresponds to a digit or a counter.

In some embodiments, the first event includes a network and/or system security incident detected by the first device.

It should be noted that the processing of information query according to embodiments of the present invention could be implemented by computer system 400.

Figure 4:
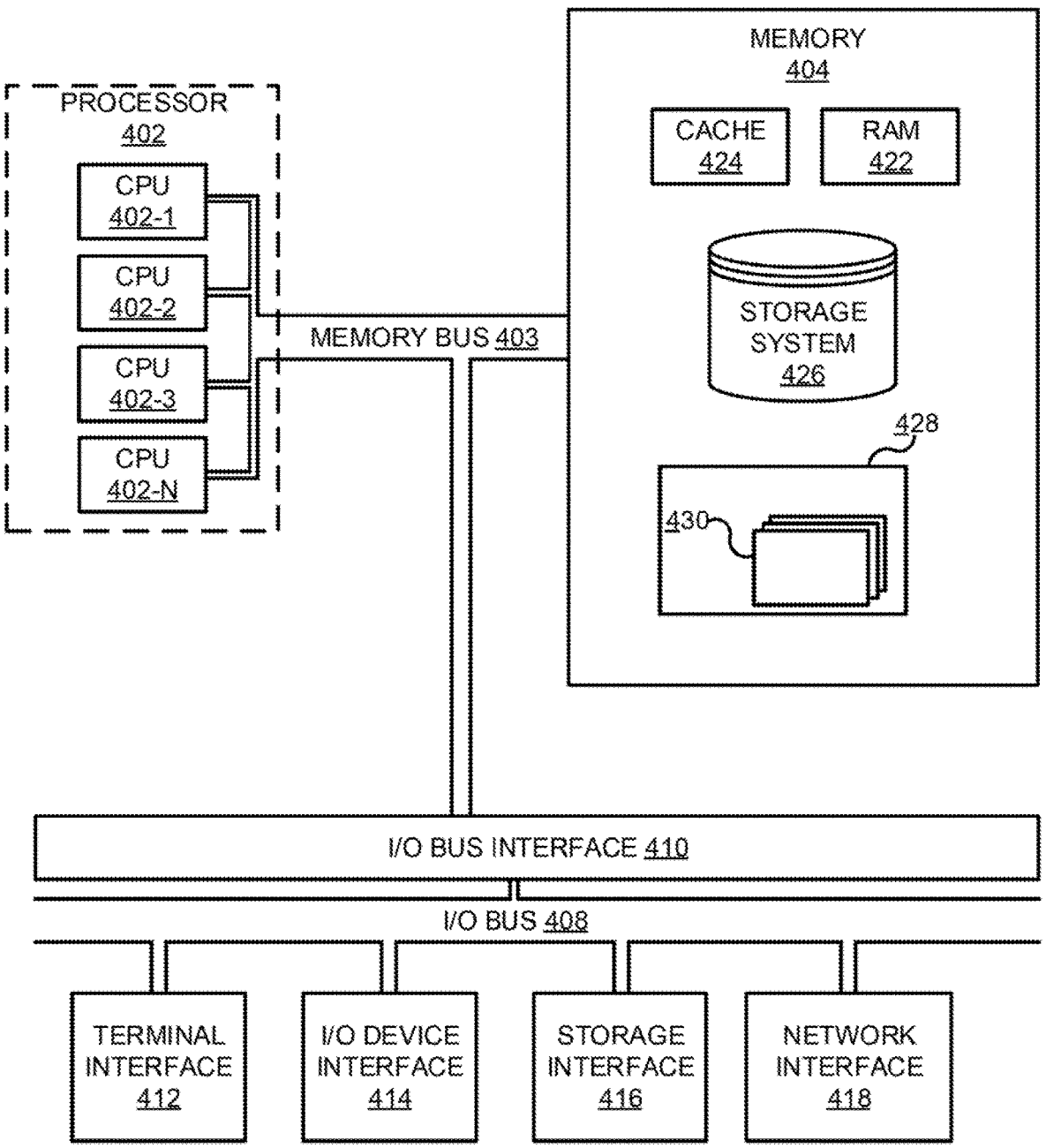
FIG. 4 is a high-level block diagram illustrating an example computer system that may be used in implementing one or more of the methods, tools, and modules, and any related functions, described herein, in accordance with embodiments of the present disclosure.

Referring now to FIG. 4, shown is a high-level block diagram of an example computer system 400 (e.g., the network environment 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 400 may comprise one or more processors 402, a memory 404, a terminal interface 412, an I/O (Input/Output) device interface 414, a storage interface 416, and a network interface 418, all of which may be communicatively coupled, directly or indirectly, for inter-component communication via a memory bus 403, an I/O bus 408, and an I/O bus interface 410.

The computer system 400 may contain one or more general-purpose programmable central processing units (CPUs) 402-1, 402-2, 402-4, and 402-N, herein generically referred to as the processor 402. In some embodiments, the computer system 400 may contain multiple processors typical of a relatively large system; however, in other embodiments, the computer system 400 may alternatively be a single CPU system. Each processor 401 may execute instructions stored in the memory 404 and may include one or more levels of on-board cache.

The memory 404 may include computer system readable media in the form of volatile memory, such as random-access memory (RAM) 422 or cache memory 424. Computer system 400 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the processors 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 400 may, in some embodiments, contain multiple I/O bus interface units, multiple I/O buses, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 400 may be a multi-user mainframe computer system, a single-user system, or a server computer or similar device that has little or no direct user interface but receives requests from other computer systems (clients). Further, in some embodiments, the computer system 400 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the major representative components of an exemplary computer system 400. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 (e.g., the network environment 100), may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

It is to be understood that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 5:
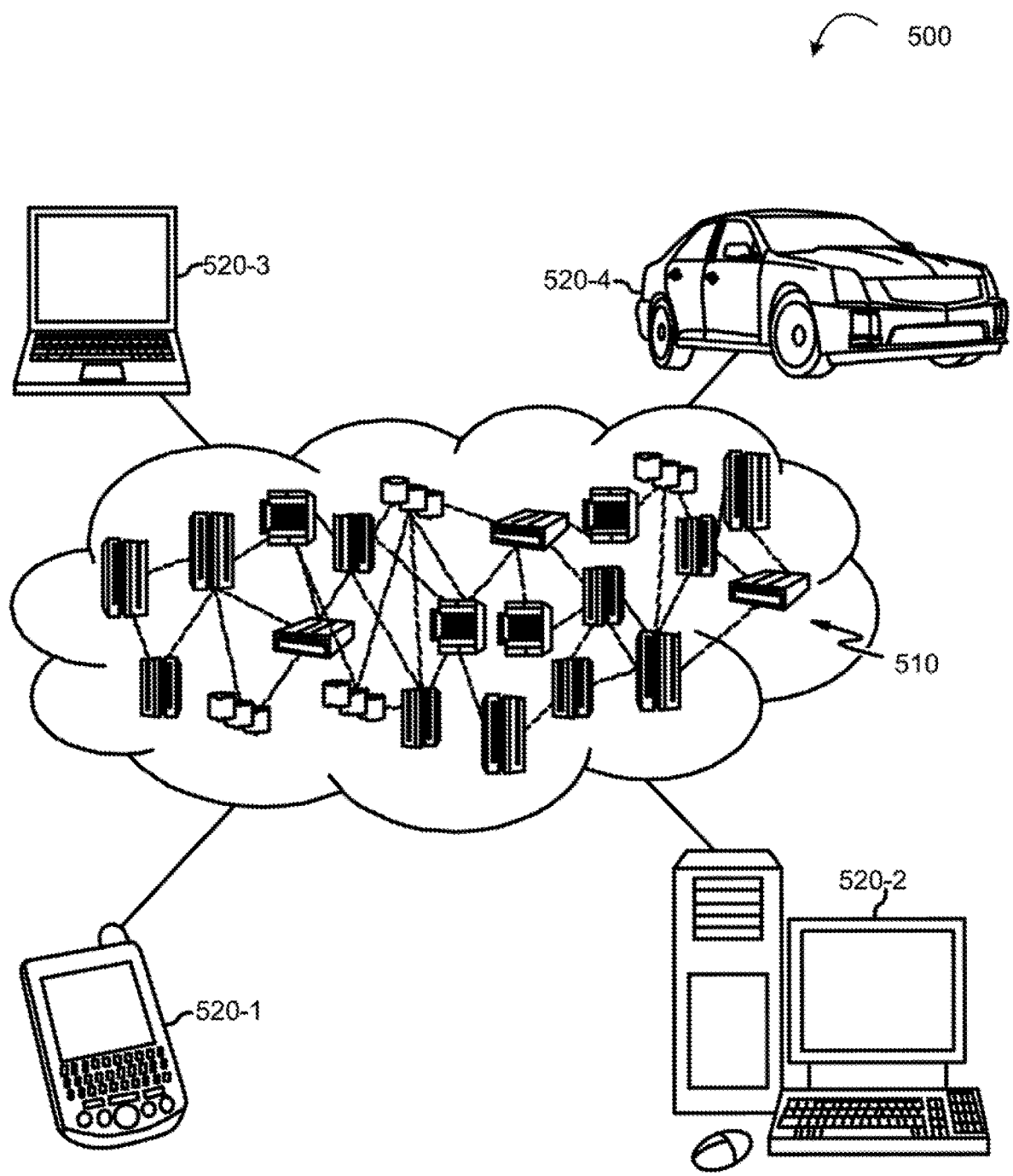
FIG. 5 depicts a cloud computing environment, in accordance with embodiments of the present disclosure.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 520-1, desktop computer 520-2, laptop computer 520-3, and/or automobile computer system 520-4 may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 520-1 to 520-4 shown in FIG. 5 are intended to be illustrative only and that computing nodes 510 and cloud computing environment 500 can communicate with any type of computerized device over any type of network and/or network addressable connection (e.g., using a web browser).

Figure 6:
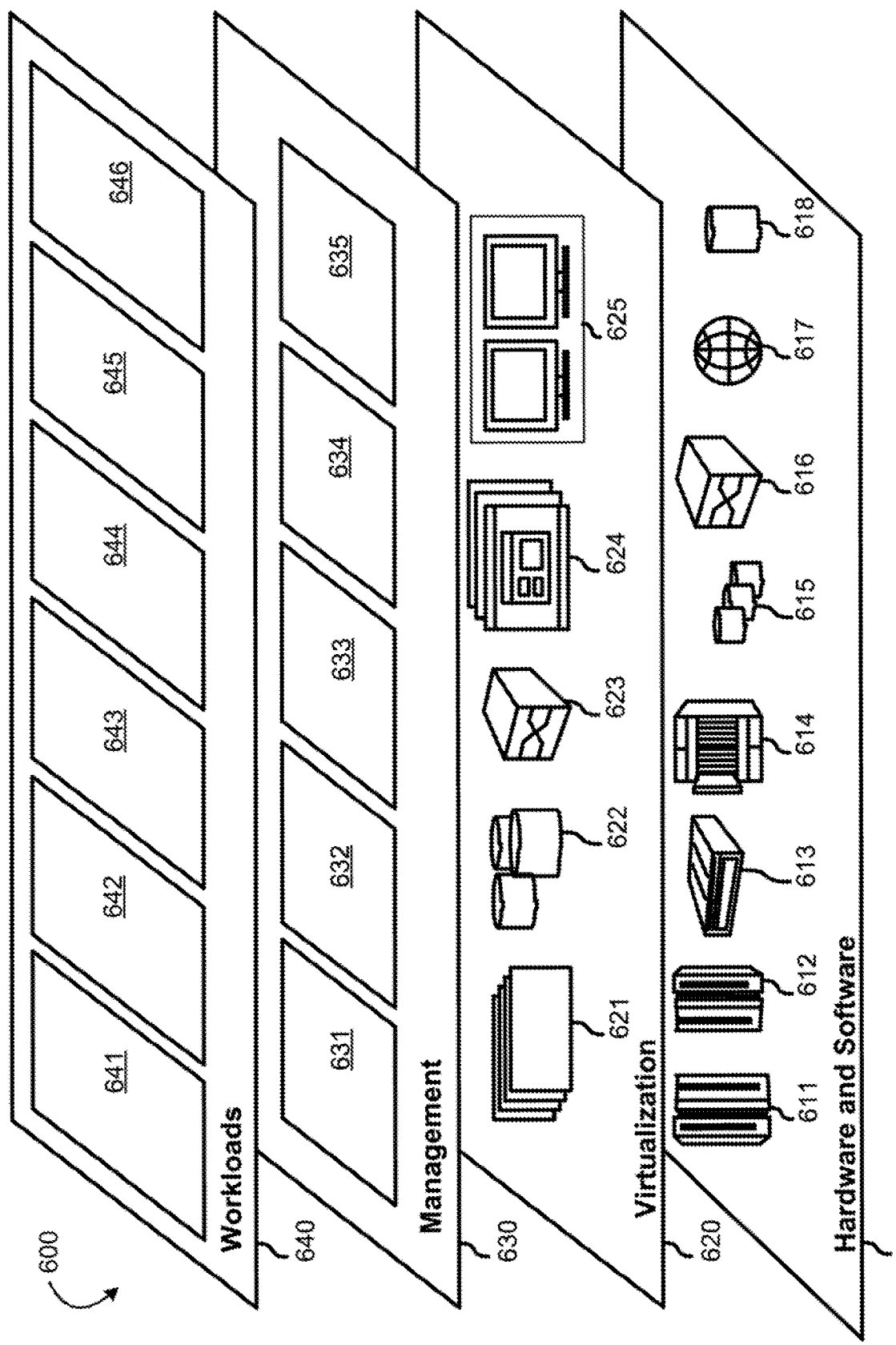
FIG. 6 depicts abstraction model layers, in accordance with embodiments of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 610 includes hardware and software components. Examples of hardware components include mainframes 611; RISC (Reduced Instruction Set Computer) architecture-based servers 612; servers 613; blade servers 614; storage devices 615; and networks and networking components 616. In some embodiments, software components include network application server software 617 and database software 618.

Virtualization layer 620 provides an abstraction layer from which the following examples of virtual entities may be provided: virtual servers 621; virtual storage 622; virtual networks 623, including virtual private networks; virtual applications and operating systems 624; and virtual clients 625.

In one example, management layer 630 may provide the functions described below. Resource provisioning 631 provides dynamic procurement of computing resources and other resources that are utilized to perform tasks within the cloud computing environment. Metering and Pricing 632 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 633 provides access to the cloud computing environment for consumers and system administrators. Service level management 634 provides cloud computing resource allocation and management such that required service levels are met. Service Level Agreement (SLA) planning and fulfillment 635 provide pre-arrangement for, and procurement of, cloud computing resources for which a future requirement is anticipated in accordance with an SLA.

Workloads layer 640 provides examples of functionality for which the cloud computing environment may be utilized. Examples of workloads and functions which may be provided from this layer include mapping and navigation 641; software development and lifecycle management 1342 (e.g., the network environment 100); virtual classroom education delivery 643; data analytics processing 644; transaction processing 645; and precision cohort analytics 646.

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method for information query, comprising:
    obtaining, by one or more processing units, a result of implementation of one or more locality-sensitive hashing (LSH) functions to feature data of a first network/system security event detected by a first device;
    mapping, by one or more processing units, the result to one or more positions in a data structure, wherein the one or more positions are indexes or sequence numbers of data elements in the data structure;
    in response to data elements of the one or more positions indicating first information associating with the one or more positions exists in a storage adapted to be used for network/system security management, obtaining, by one or more processing units, the first information from the storage; and
    sending, by one or more processing units, the first information to the first device
    wherein the first information stored in the storage is shared with a second device when the second device detects that a second network/system security event is similar to the first network/system security event.

2. The computer-implemented method of claim 1, further comprising:
    in response to the data elements of the one or more positions indicating no associated information exists, sending, by one or more processing units, a negative response message to the first device.

3. The computer-implemented method of claim 1, further comprising:
    receiving, by one or more processing units, a second information from the first device;
    associating, by one or more processing units, the second information with the one or more positions;
    storing, by one or more processing units, the second information; and
    updating, by one or more processing units, the data elements of the one or more positions to indicate the second information associating with the one or more positions exists in the storage.

4. The computer-implemented method of claim 1, wherein the first information includes information related to the second network/system security event, and the result of implementation of the one or more LSH functions to feature data of the second network/system security event is the same as the result of implementation of the LSH functions to the feature data of the first network/system security event.

5. The computer-implemented method of claim 4, wherein the information related to the second network/system security event includes measures or instructions related to the second network/system security event.

6. The computer-implemented method of claim 1, wherein the feature data of the first network/system security event includes access restriction data.

7. The computer-implemented method of claim 1, wherein the data structure is applied in a Bloom Filter, and data elements of the one or more positions comprise a digit or a counter.

8. The computer-implemented method of claim 1, wherein the first network/system security event includes a network and/or system security incident.

9. A computer system for information query, comprising:
    one or more processors;
    a computer-readable memory coupled to the processors, the computer-readable memory comprising instructions that when executed by the processors perform actions of:
    obtaining a result of implementation of one or more Locality-Sensitive Hashing (LSH) functions to feature data of a first network/system security event detected by a first device;

mapping the result to one or more positions in a data structure, wherein the one or more positions are indexes or sequence numbers of data elements in the data structure;

obtaining, in response to data elements of the one or more positions indicating a first information associating with the one or more positions exists in a storage adapted to be used for network/system security management, the first information from the storage; and sending the first information to the first device wherein the first information stored in the storage is shared with a second device when the second device detects that the first a second network/system security event is similar to the first network/system security event.

10. The computer system of claim 9, further comprising:
sending, in response to the data elements of the one or more positions indicating no associated information exists, a negative response message to the first device.

11. The computer system of claim 9, further comprising:
receiving a second information from the first device;
associating the second information with the one or more positions;
storing the second information; and
updating the data elements of the one or more positions to indicate the second information associating with the one or more positions exists in the storage.

12. The computer system of claim 9, wherein the first information includes information related to the second network/system security event, and the result of implementation of the one or more LSH functions to feature data of the second network/system security event is the same as the result of implementation of the LSH functions to the feature data of the first network/system security event.

13. The computer system of claim 12, wherein the information related to the second network/system security event includes measures or instructions related to the second network/system security event.

14. The computer system of claim 9, wherein the feature data of the first network/system security event includes access restricted data.

15. The computer system of claim 9, wherein the data structure is applied in a Bloom Filter, and data elements of the one or more positions comprise a digit or a counter.

16. The computer system of claim 9, wherein the first network/system security includes a network and/or system security incident.

17. A computer program product, comprising a computer readable storage medium having program instructions embodied therewith, the program instructions executable by a processor to cause the processor to perform actions of:

obtaining a result of implementation of one or more Locality-Sensitive Hashing (LSH) functions to feature data of a first network/system security event detected by a first device;

mapping the result to one or more positions in a data structure, wherein the one or more positions are indexes or sequence numbers of data elements in the data structure;

obtaining, in response to data elements of the one or more positions indicating first information associating with the one or more positions exists in a storage adapted to be used for network/system security management, the first information from the storage; and sending the first information to the first device wherein the first information stored in the storage is shared with a second device when the second device detects that a second network/system security event is similar to the first network/system security event.

18. The computer program product of claim 17, further comprising:
sending, in response to the data elements of the one or more positions indicating no associated information exists, a negative response message to the first device.

19. The computer program product of claim 17, further comprising:
receiving a second information from the first device;
storing the second information and association of the second information with the one or more positions; and
updating the data elements of the one or more positions to indicate the second information associating with the one or more positions exists in the storage.

20. The computer program product of claim 17, wherein the first information includes information related to the second network/system security event, and the result of implementation of the one or more LSH functions to feature data of the second network/system security event is the same as the result of implementation of the LSH functions to the feature data of the first network/system security event.

* * * * *